(12) United States Patent
Shinozaki et al.

(10) Patent No.: US 9,903,613 B2
(45) Date of Patent: Feb. 27, 2018

(54) SOLAR HEAT COLLECTION SYSTEM

(71) Applicant: MITSUBISHI HITACHI POWER SYSTEMS, LTD., Yokohama-shi, Kanagawa (JP)

(72) Inventors: Kohei Shinozaki, Kure (JP); Takahiro Marumoto, Kure (JP); Tetsuo Shikata, Yokohama (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 171 days.

(21) Appl. No.: 14/776,801

(22) PCT Filed: Mar. 5, 2014

(86) PCT No.: PCT/JP2014/055627
§ 371 (c)(1),
(2) Date: Sep. 15, 2015

(87) PCT Pub. No.: WO2014/148259
PCT Pub. Date: Sep. 25, 2014

(65) Prior Publication Data
US 2016/0025383 A1    Jan. 28, 2016

(30) Foreign Application Priority Data
Mar. 18, 2013  (JP) ................................ 2013-055282

(51) Int. Cl.
F24J 2/40        (2006.01)
F24J 2/04        (2006.01)
(Continued)

(52) U.S. Cl.
CPC .............. *F24J 2/402* (2013.01); *F03G 6/067* (2013.01); *F24J 2/0494* (2013.01); *F24J 2/07* (2013.01);
(Continued)

(58) Field of Classification Search
CPC .................... F24J 2/40; F24J 2/10; F24J 2/07
(Continued)

(56) References Cited

U.S. PATENT DOCUMENTS 8,887,470 B2 * 11/2014 Werner ....................... F24J 2/14
126/600
8,918,225 B2 * 12/2014 Lazaris ................... H02J 3/382
290/44
(Continued)

FOREIGN PATENT DOCUMENTS

JP         56-155339 A      12/1981
JP         2011-47364 A      3/2011
(Continued)

OTHER PUBLICATIONS

International Search Report dated Jun. 3, 2014, issued in counterpart International Application No. PCT/JP2014/055627 (2 pages).

Primary Examiner — Gregory Huson
Assistant Examiner — Nikhil Mashruwala
(74) Attorney, Agent, or Firm — Westerman, Hattori, Daniels & Adrian

(57) ABSTRACT

The inventive solar heat collection system reduces the risk of damage to heat transfer pipes of a high-temperature heat collection device. The low-temperature heat collection device (1) heats water by sunlight heat to generate steam. The steam-water separation device (4) separates a water-steam two-phase fluid generated in the low-temperature heat collection device into water and steam. The high-temperature heat collection device (5) heats the steam separated by the steam-water separation device by use of heat of sunlight reflected by a plurality of heliostats (8), thereby generating superheated steam. The heliostat control device (13) controls angles of the plurality of heliostats so that metal temperature of the high-temperature heat collection device is maintained not to be higher than a threshold temperature set to prevent overshoot of steam temperature at an outlet of the high-temperature heat collection device.

5 Claims, 14 Drawing Sheets

(51) Int. Cl.
  *F24J 2/07*  (2006.01)
  *F24J 2/46*  (2006.01)
  *F24J 2/10*  (2006.01)
  *F03G 6/06*  (2006.01)
  *F24J 2/00*  (2014.01)

(52) U.S. Cl.
  CPC ............... *F24J 2/10* (2013.01); *F24J 2/4623* (2013.01); *F24J 2/4625* (2013.01); *F24J 2002/0038* (2013.01); *F24J 2002/075* (2013.01); *Y02E 10/41* (2013.01); *Y02E 10/44* (2013.01); *Y02E 10/46* (2013.01)

(58) Field of Classification Search
  USPC .............. 126/572, 600, 685, 663; 60/641.15, 60/39.182
  See application file for complete search history.

(56) References Cited

U.S. PATENT DOCUMENTS

| | | | | |
|---|---|---|---|---|
| 9,068,740 | B2* | 6/2015 | Takeda | F01K 3/24 |
| 9,605,662 | B2* | 3/2017 | Marumoto | F03G 6/065 |
| 2005/0126170 | A1* | 6/2005 | Litwin | F03G 6/065 |
| | | | | 60/641.8 |
| 2006/0261591 | A1* | 11/2006 | Hewitt | B42D 1/08 |
| | | | | 281/22 |
| 2009/0241939 | A1* | 10/2009 | Heap | F22B 1/006 |
| | | | | 126/645 |
| 2009/0260622 | A1* | 10/2009 | Palkes | F01K 3/186 |
| | | | | 126/610 |
| 2011/0048011 | A1 | 3/2011 | Okita et al. | |
| 2012/0144831 | A1* | 6/2012 | Feldhoff | F22B 1/006 |
| | | | | 60/641.8 |
| 2012/0186251 | A1* | 7/2012 | Epstein | F03G 6/065 |
| | | | | 60/641.11 |
| 2012/0325314 | A1* | 12/2012 | Cheung | F24J 2/38 |
| | | | | 136/259 |
| 2014/0138952 | A1 | 5/2014 | Marumoto et al. | |
| 2015/0192327 | A1* | 7/2015 | Marumoto | F24J 2/265 |
| | | | | 126/600 |

FOREIGN PATENT DOCUMENTS

| | | |
|---|---|---|
| JP | 2011-163594 A | 8/2011 |
| JP | 2012-127536 A | 7/2015 |
| WO | 2013/002054 A1 | 1/2013 |
| WO | 2013/065667 A1 | 5/2013 |
| WO | 2014/034656 A1 | 3/2014 |

\* cited by examiner

[FIG.1]
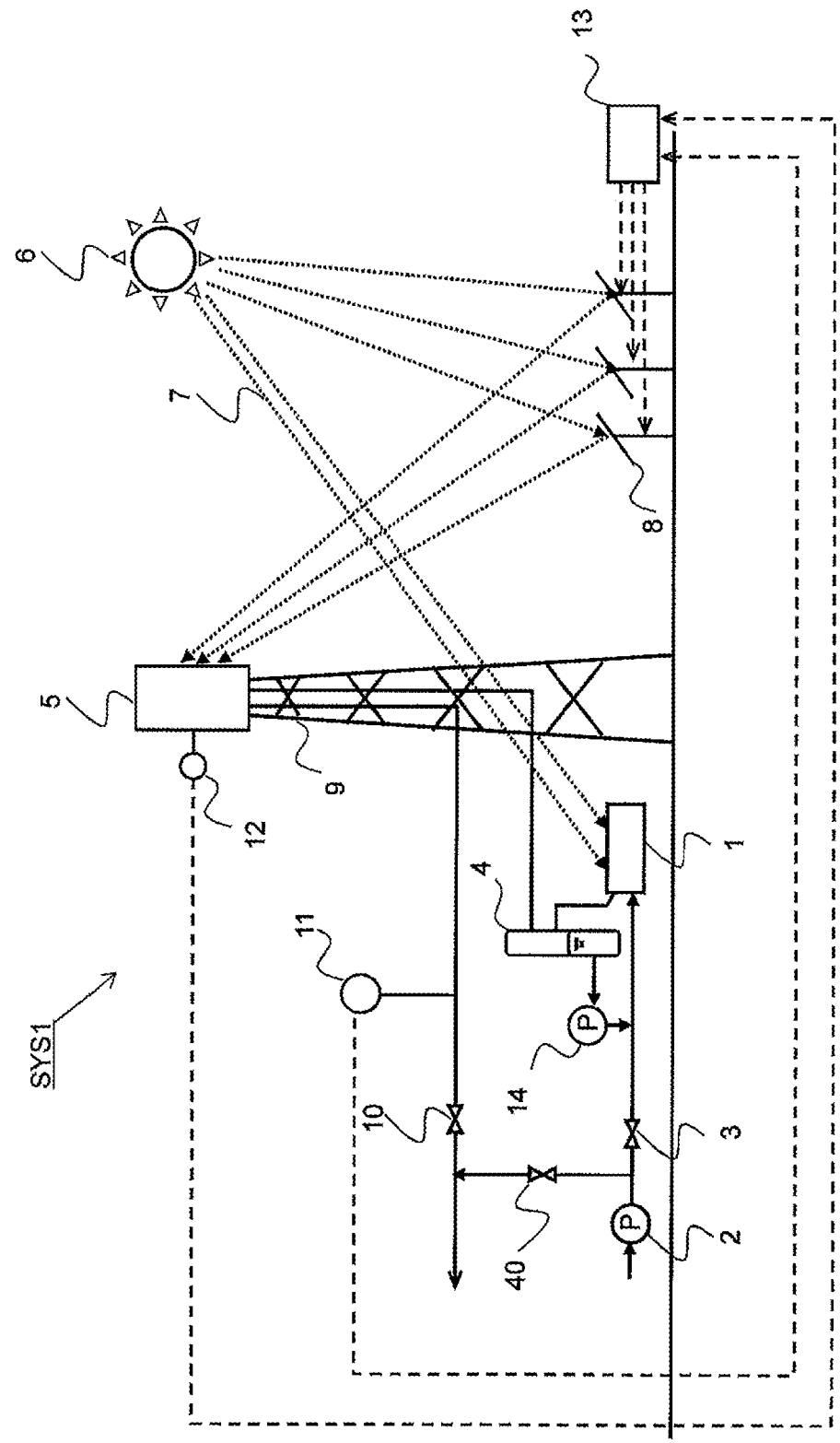

[FIG. 2]
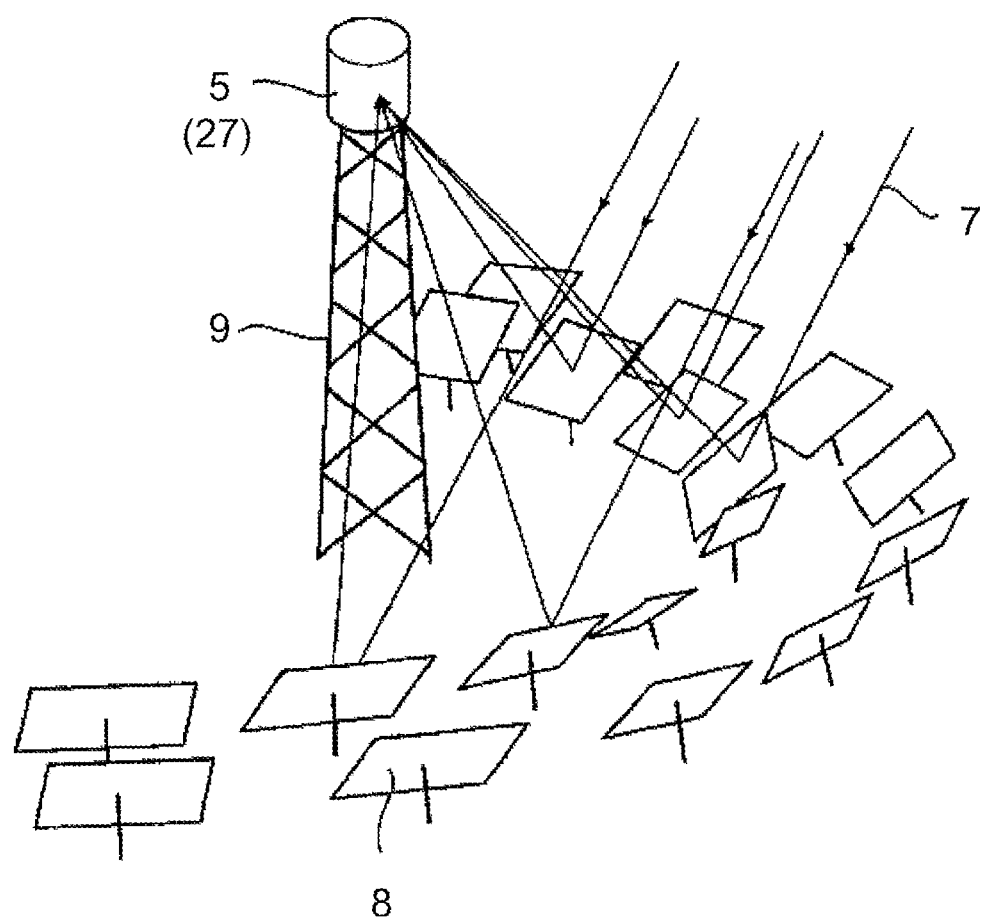

[FIG. 3]
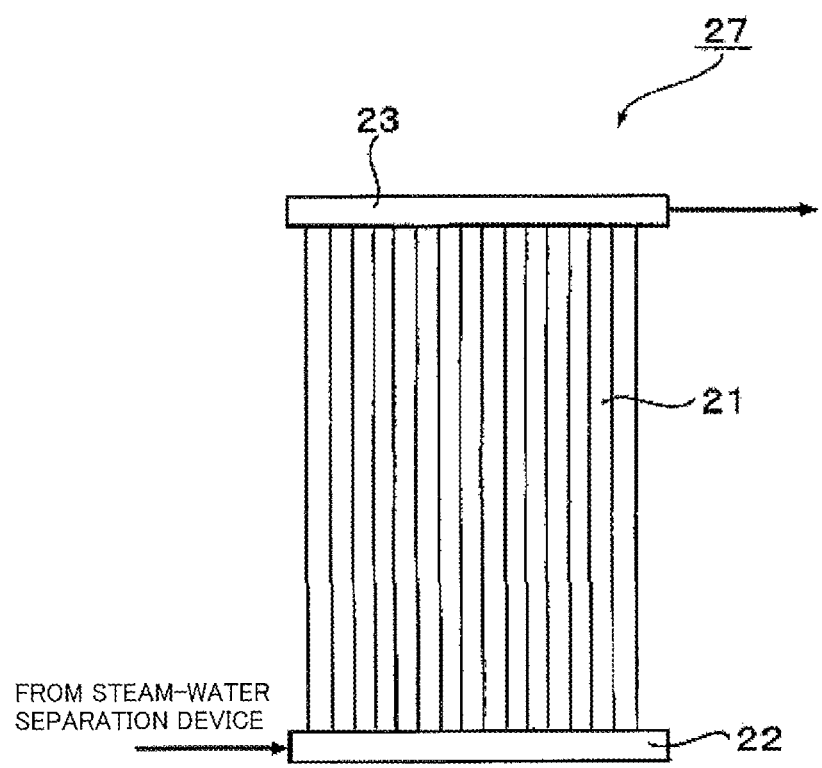

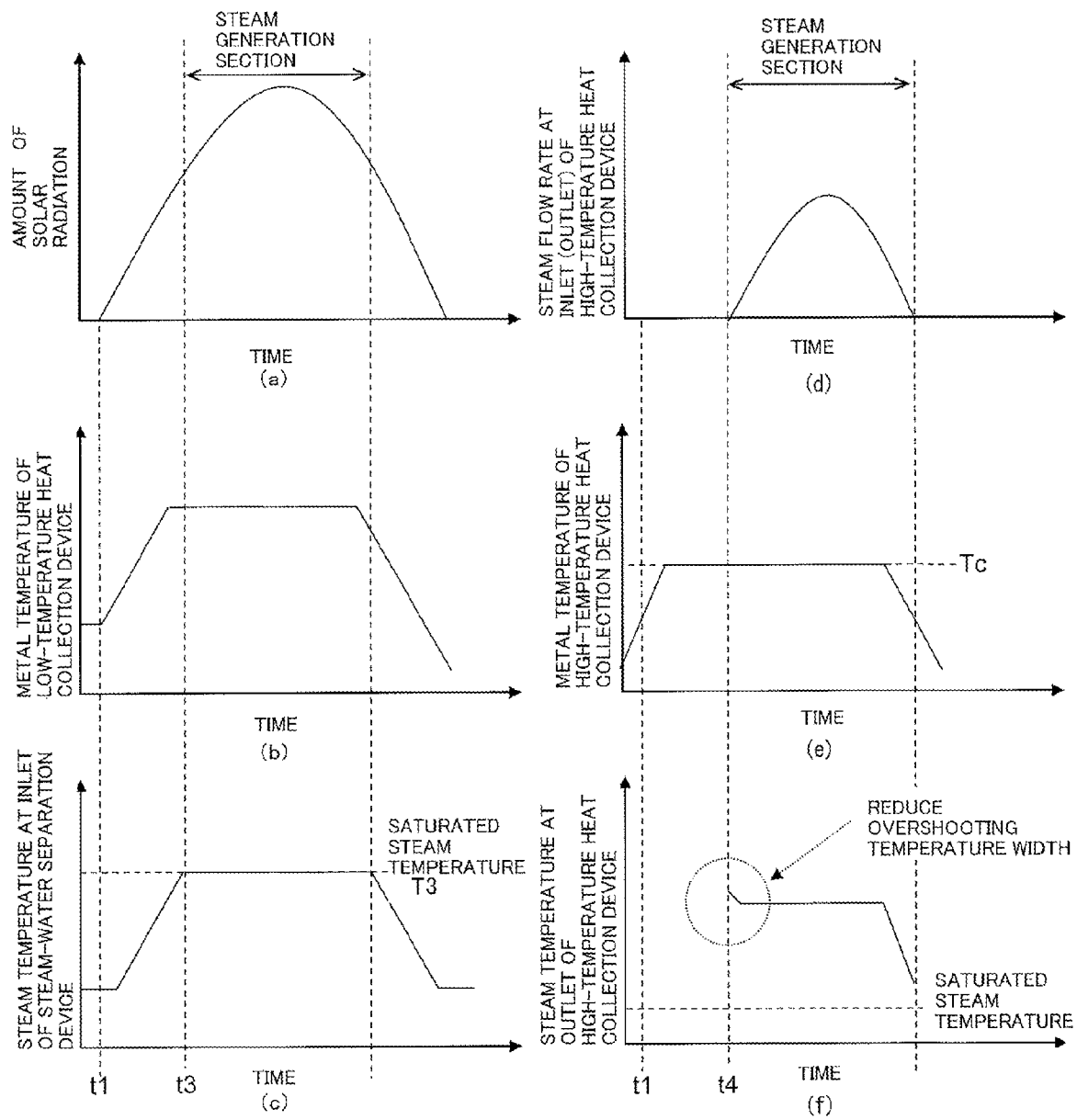
[FIG. 4]

[FIG.5]
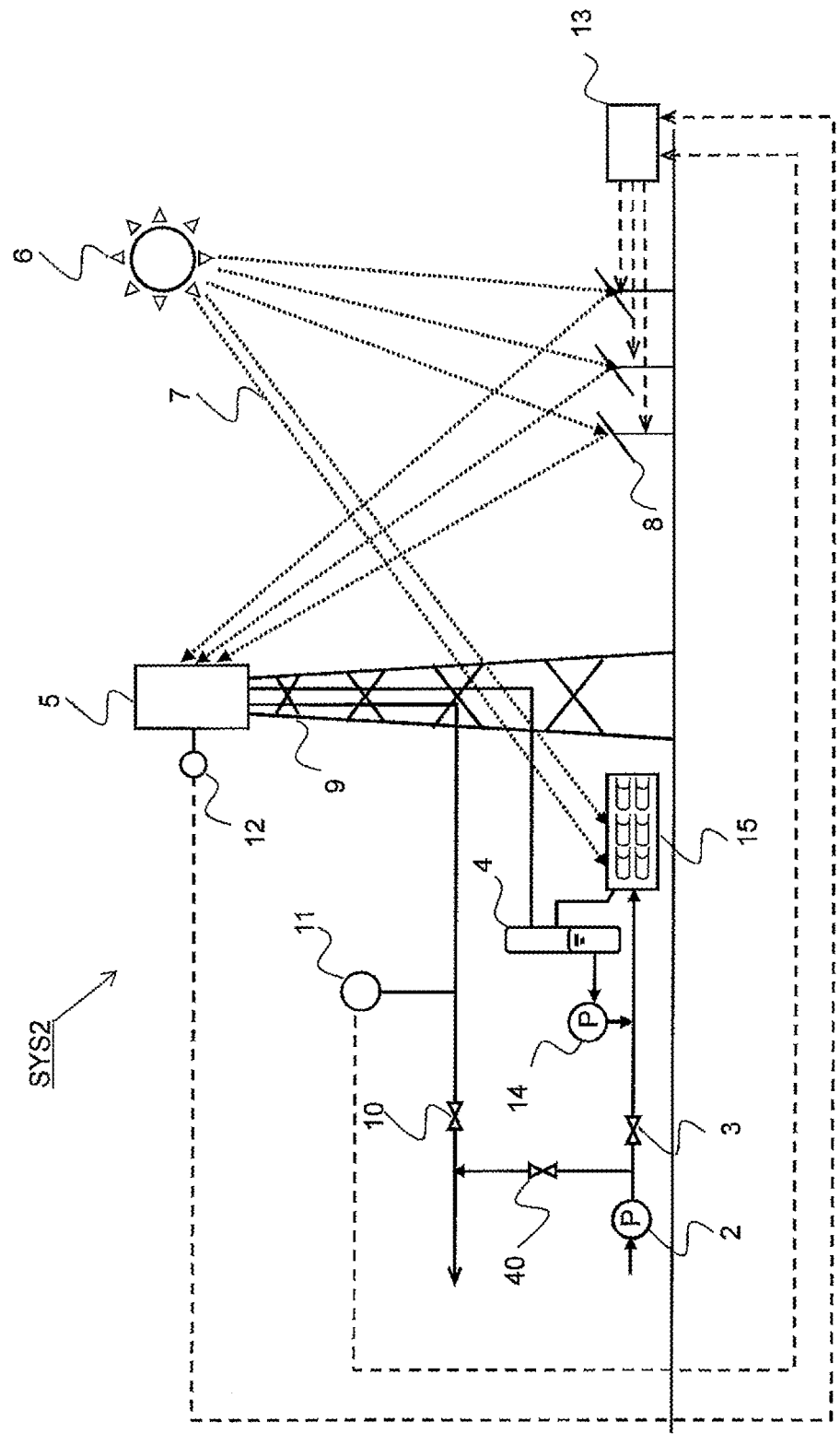

[FIG. 6]
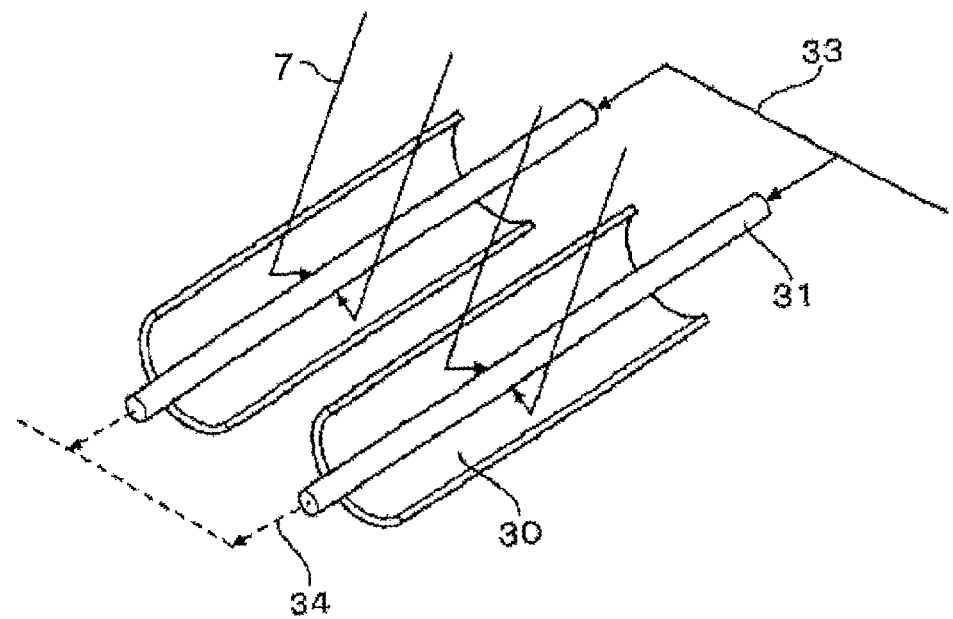
[FIG. 7]
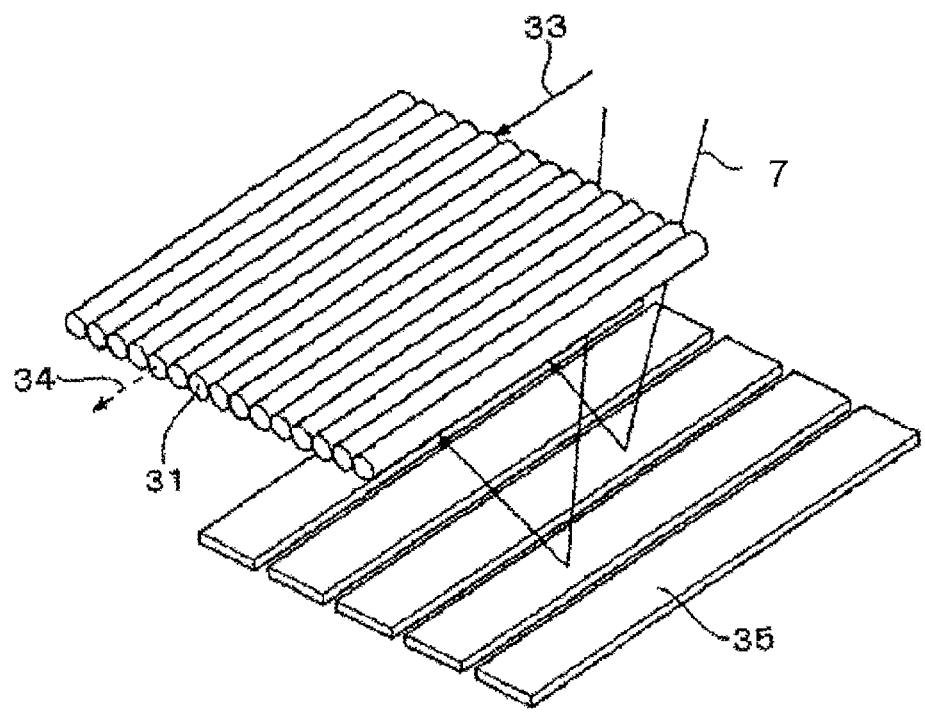

[FIG.8]
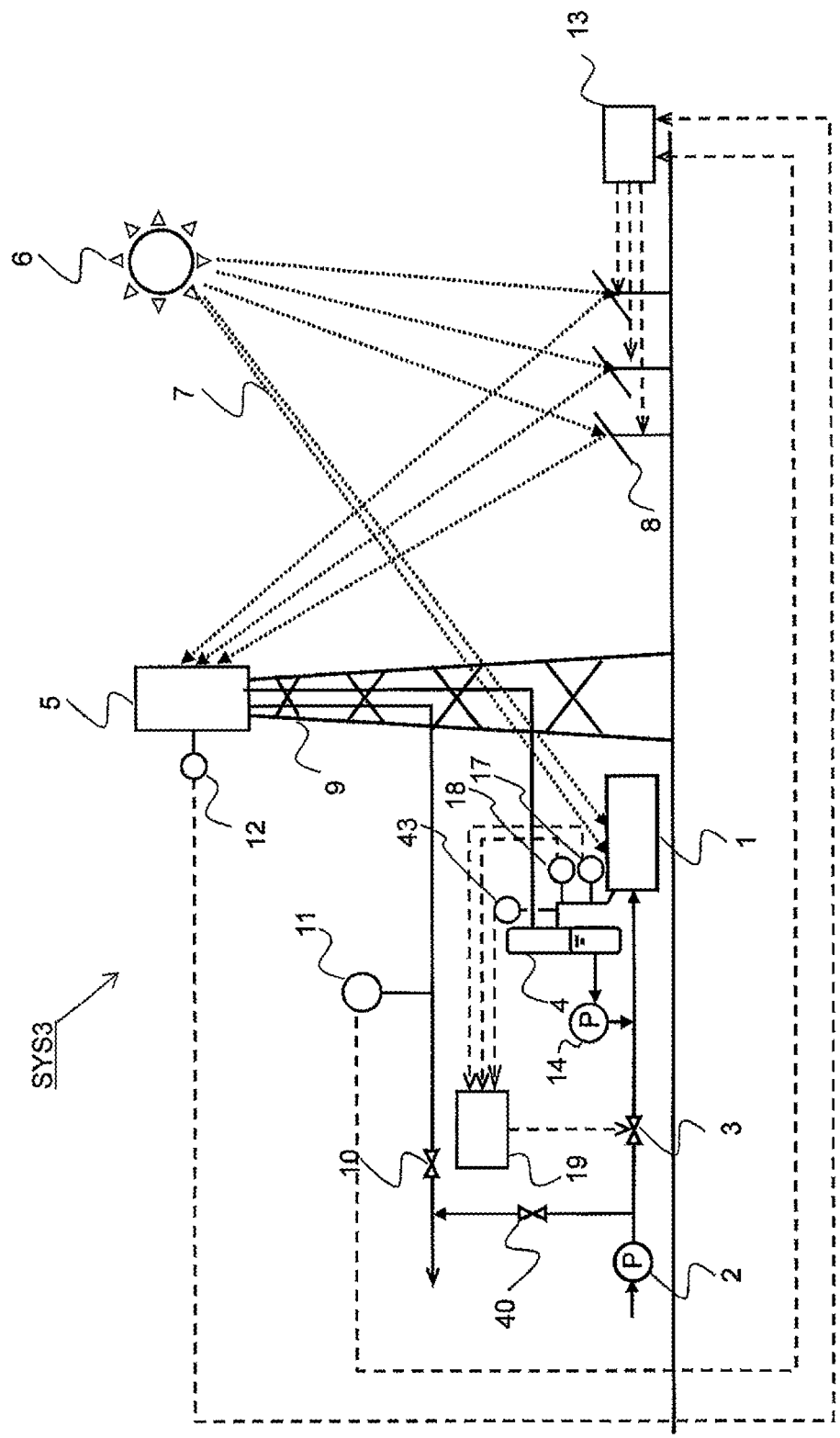

[FIG.9]
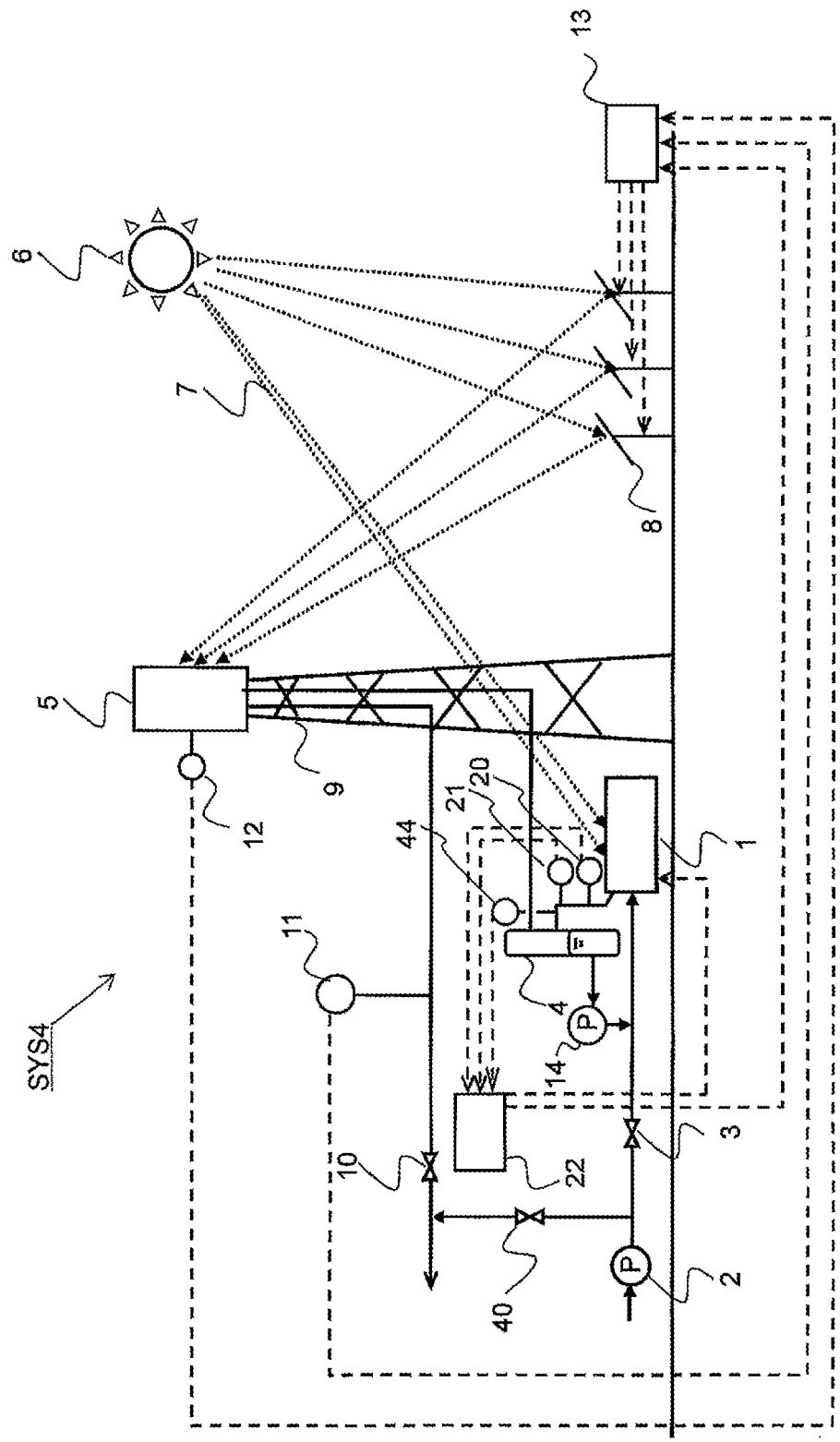

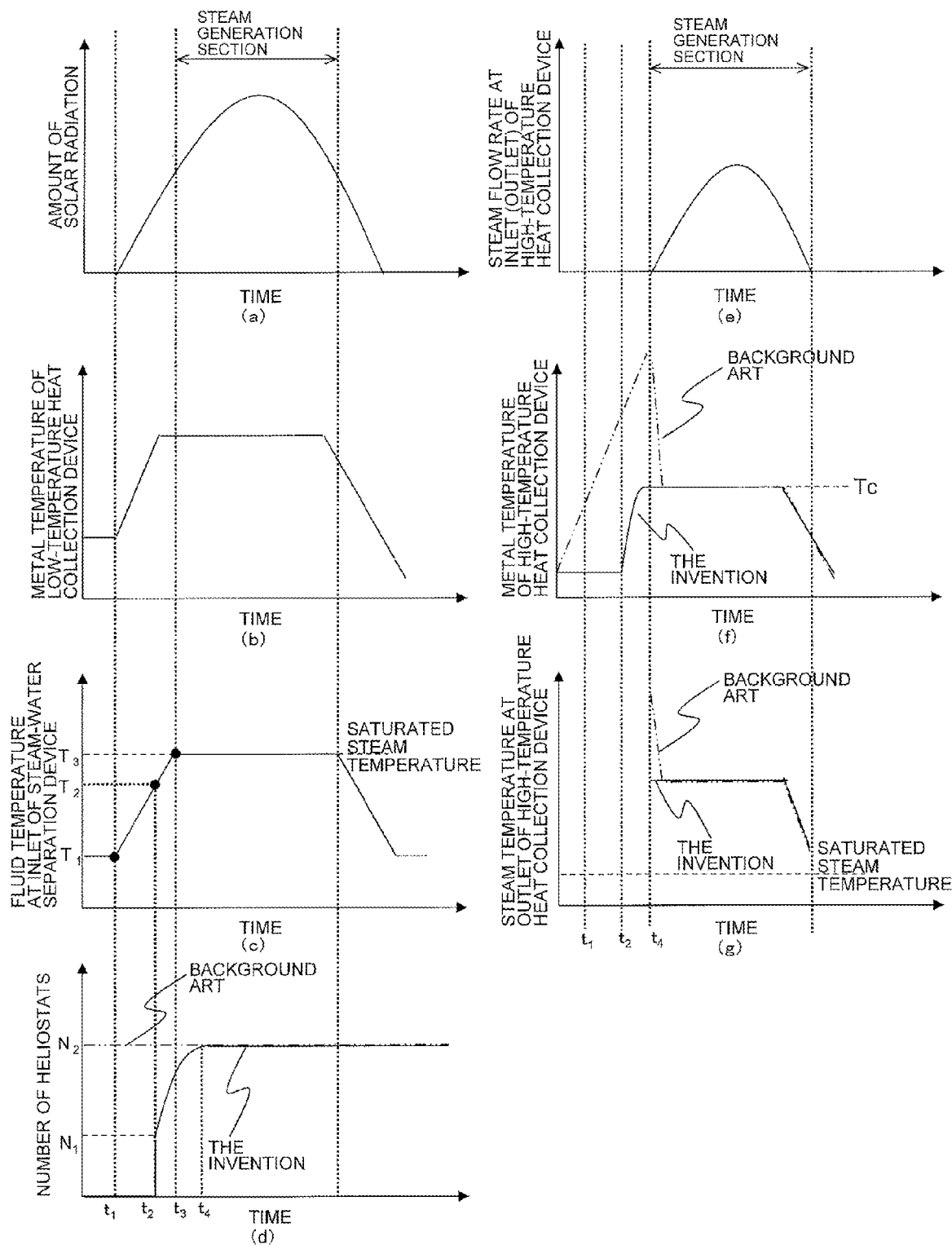
[FIG. 10]

[FIG. 11]
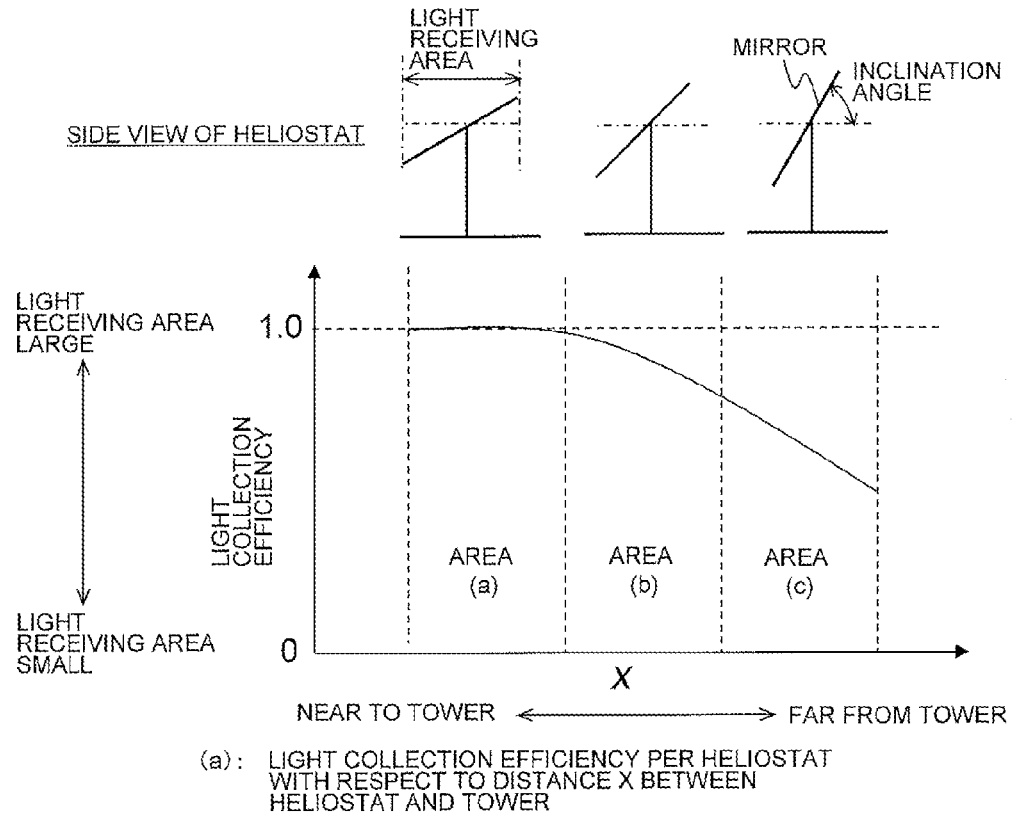
(a): LIGHT COLLECTION EFFICIENCY PER HELIOSTAT WITH RESPECT TO DISTANCE X BETWEEN HELIOSTAT AND TOWER
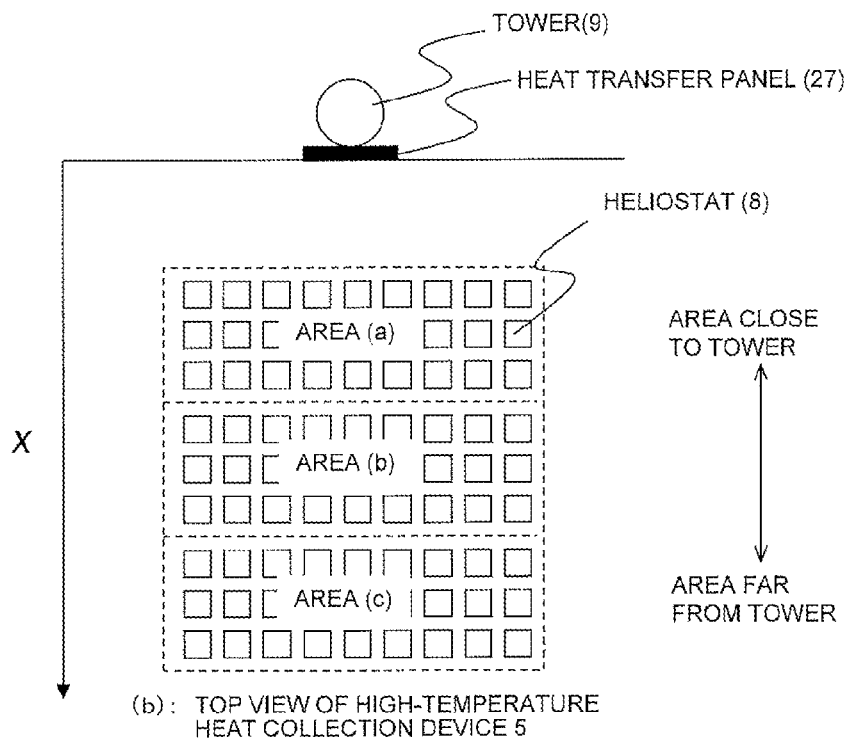
(b): TOP VIEW OF HIGH-TEMPERATURE HEAT COLLECTION DEVICE 5

[FIG.12]
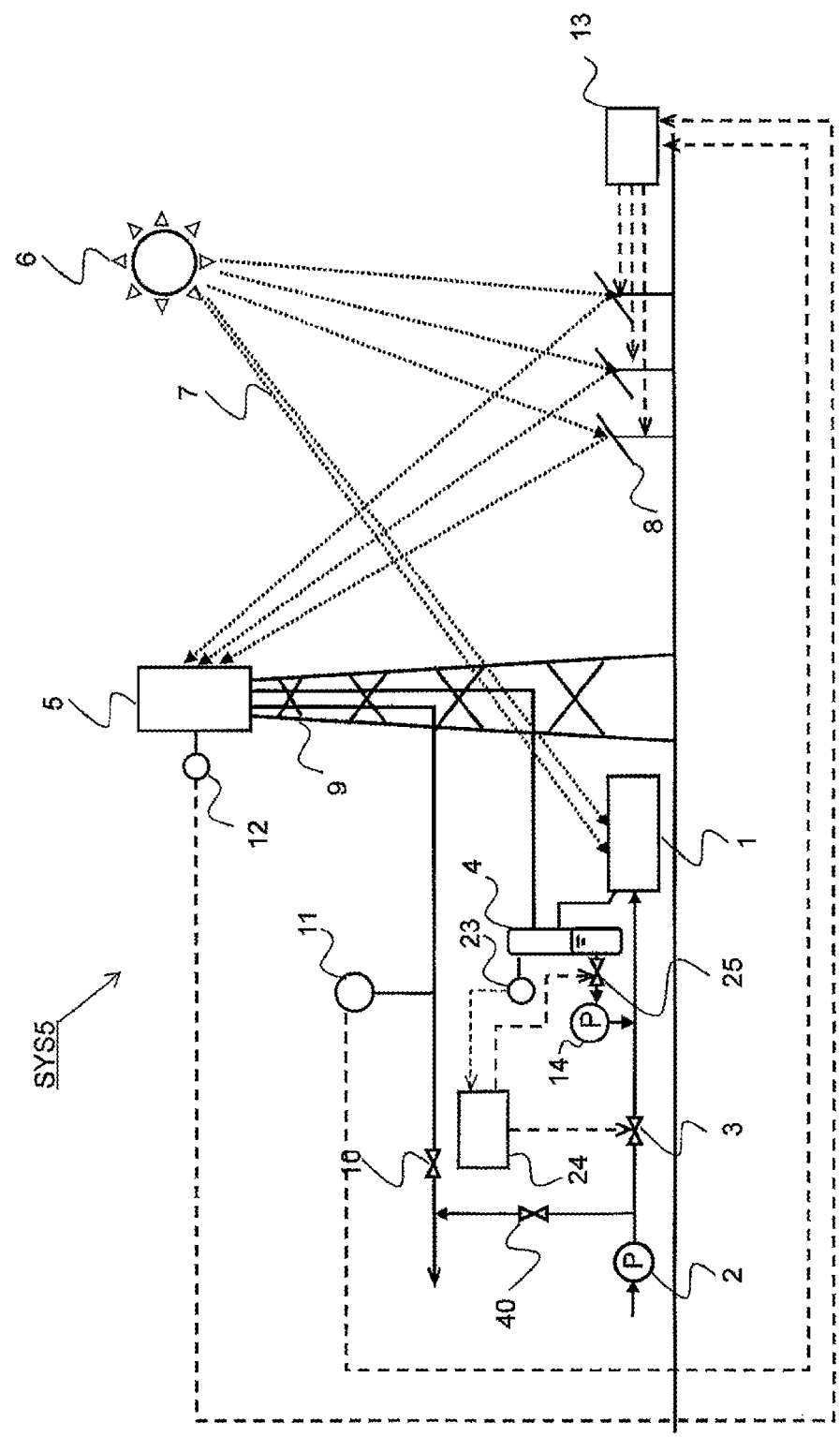

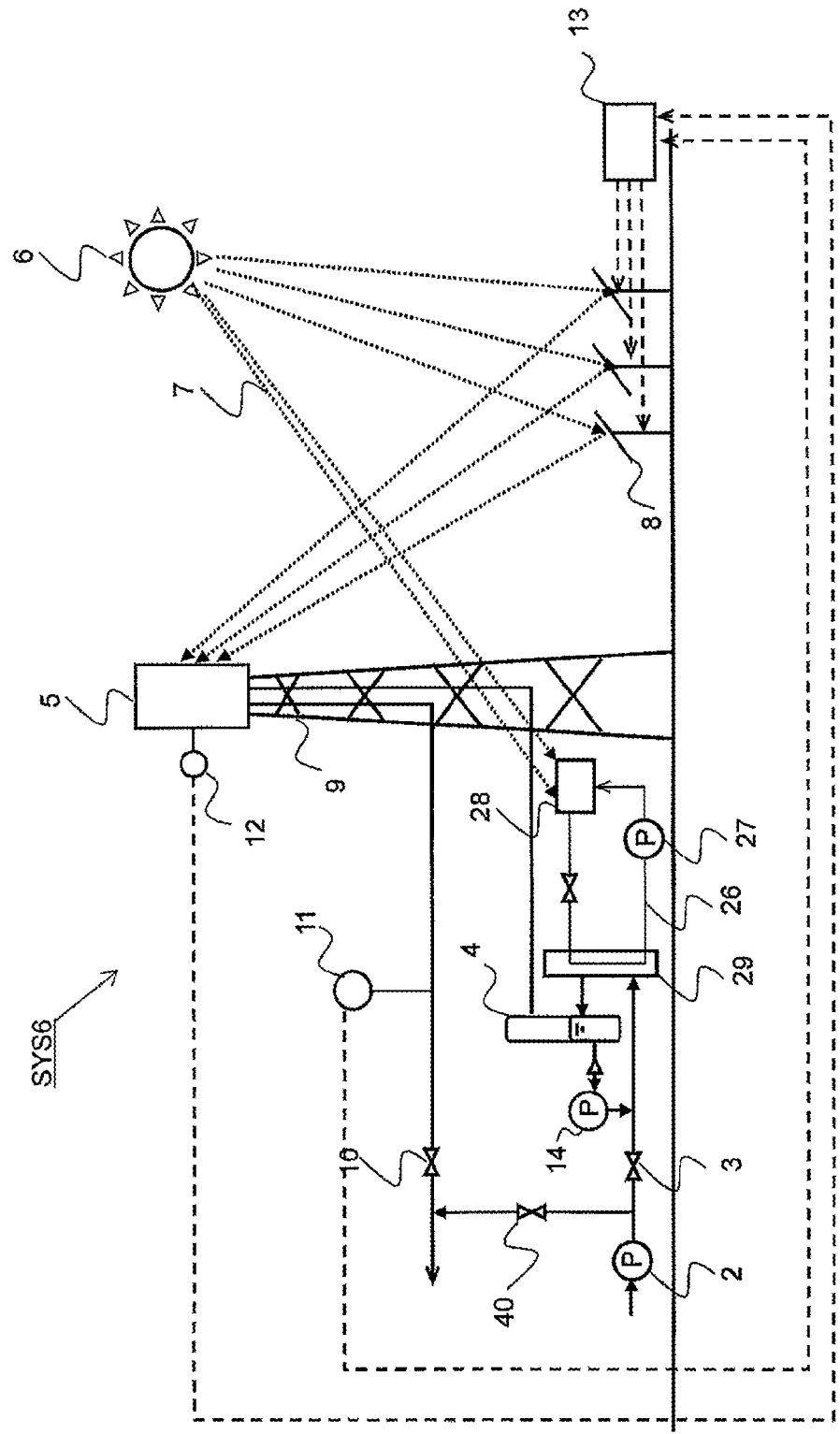
[FIG.13]

[FIG. 14]
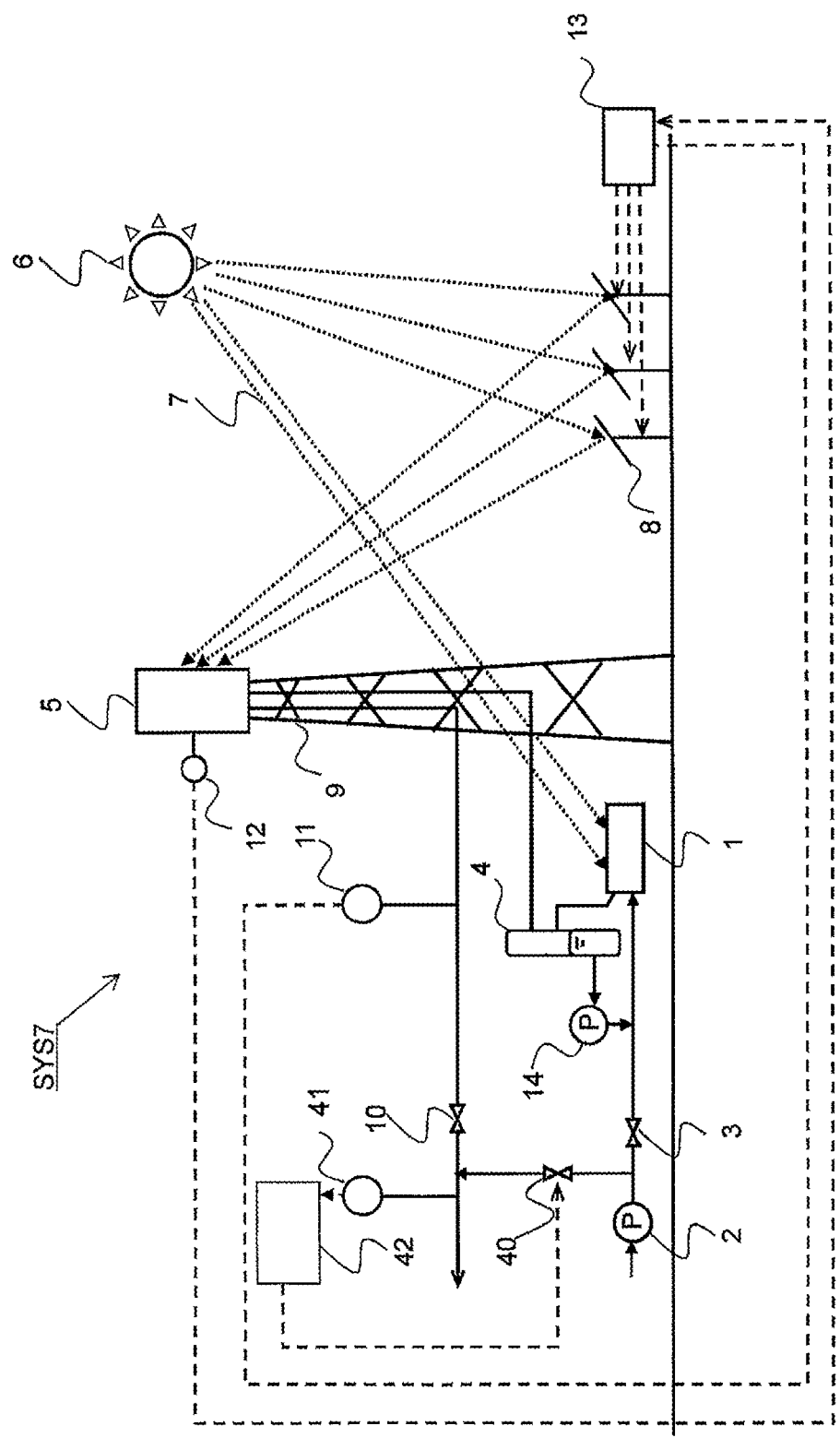

[FIG. 15]
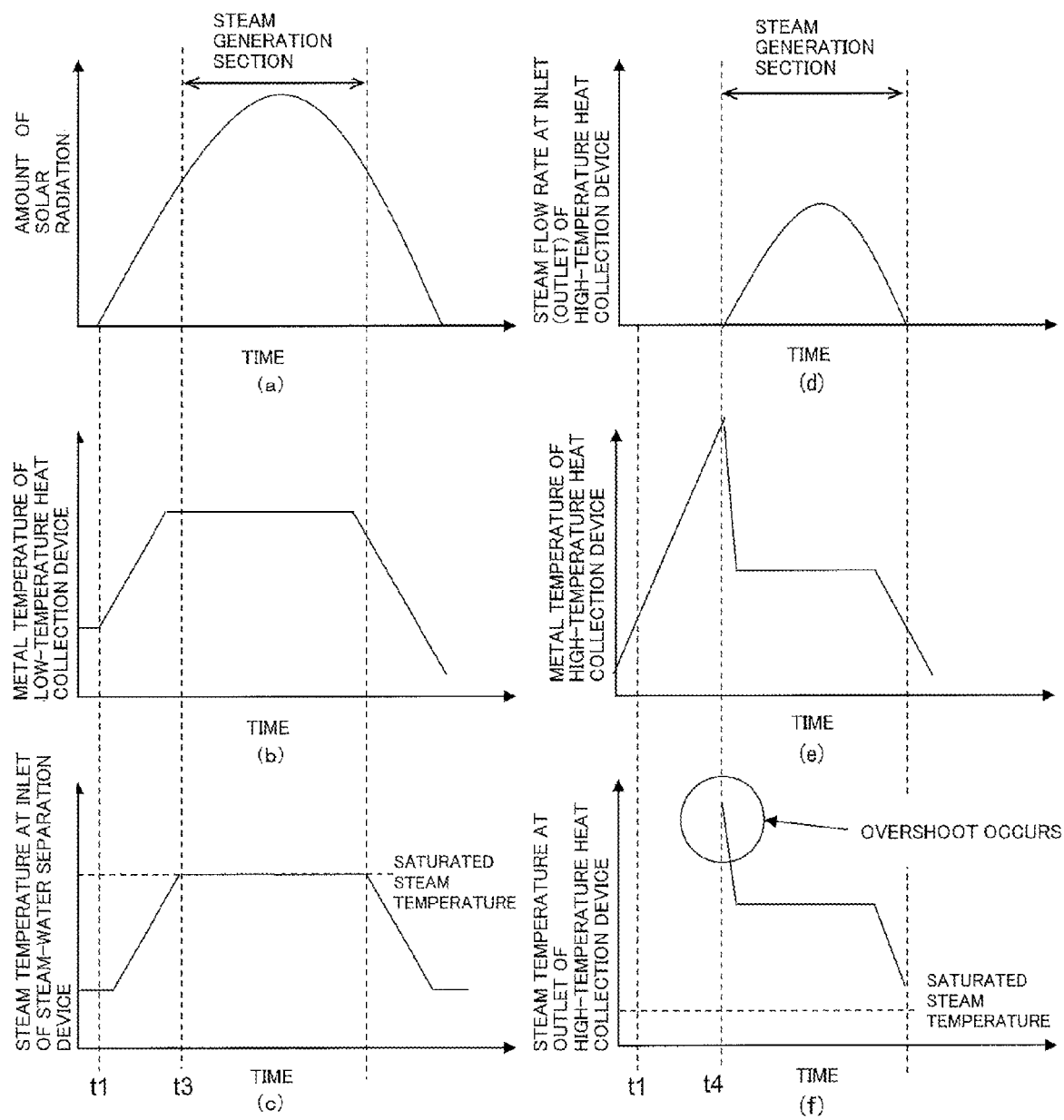

SOLAR HEAT COLLECTION SYSTEM

TECHNICAL FIELD

The present invention relates to a solar heat collection system which collects heat from the sun and generates steam by use of the heat.

BACKGROUND ART

For example, background-art techniques in this technical field include International Publication WO 2013/002054 Pamphlet (Patent Literature 1). In the Pamphlet, there has been described a solar heat collection system which is provided with a low-temperature heating device, a steam-water separation device, a high-temperature heating device, and a circulating pump (see Abstract). The low-temperature heating device heats water supplied from a feedwater pump by use of sunlight heat. The steam-water separation device separates a water-steam two-phase fluid generated by the low-temperature heating device into water and steam. The high-temperature heating device heats the steam separated by the steam-water separation device by use of the sunlight heat. The circulating pump supplies the water separated by the steam-water separation device to the low-temperature heating device.

CITATION LIST

Patent Literature

Patent Literature 1: International Publication WO 2013/002054 Pamphlet

SUMMARY OF INVENTION

Technical Problem

Change in amount of solar radiation, change in metal temperature of the low-temperature heat collection device, change in steam temperature at an inlet of the steam-water separation device, change in steam flow rate at an inlet (outlet) of the high-temperature heat collection device, change in metal temperature of the high-temperature heat collection device, and change in steam temperature at the outlet of the high-temperature heat collection device in the case in which the solar heat collection system in Patent Literature 1 is used to generate steam are shown in FIGS. 15(a), (b), (c), (d), (e) and (f) respectively.

When the amount of solar radiation begins to increase in a time instant t1 as shown in FIG. 15(a), the low-temperature heat collection device and the high-temperature heat collection device are started up and the metal temperatures of the respective heat collection devices begin to increase as shown in FIG. 15(b) and FIG. 15(e). Water supplied to the low-temperature heat collection device is heated up to a saturated steam temperature in a time instant t3 and a water-steam two-phase fluid which has reached the saturation temperature is separated into steam and water by the steam-water separation device (FIG. 15(c)). On the other hand, from the time instant t1 to a time instant t4 (which is a time instant slightly later than t3), steam has not flown into the high-temperature heat collection device yet but the metal temperature of the high-temperature heat collection device continues to rise, as shown in FIG. 15(d). When the steam which has begun to increase gradually is made to flow from the steam-water separation device into the high-temperature heat collection device in this state, the steam temperature at the outlet of the high-temperature heat collection device overshoots in the time instant t4, as shown in FIG. 15(f). As a result, there is a possibility that heat transfer pipes of the high-temperature heat collection device may be damaged.

The invention has been accomplished in consideration of the aforementioned actual circumstances. An object of the invention is to reduce the risk of damage to heat transfer pipes of a high-temperature heat collection device in a solar heat collection system.

Solution to Problem

In order to achieve the aforementioned object, according to a first configuration of the invention, there is provided a solar heat collection system including: a low-temperature heat collection device which heats supplied water by use of sunlight heat to thereby generate steam; a steam-water separation device which separates a water-steam two-phase fluid generated by the low-temperature heat collection device into water and steam; a high-temperature heat collection device which heats the steam separated by the steam-water separation device by use of heat of sunlight which is reflected by a plurality of heliostats to thereby generate superheated steam; and a heliostat control device which controls angles of the plurality of heliostats so that metal temperature of the high-temperature heat collection device cannot be higher than a threshold temperature which is set in order to prevent overshoot of steam temperature at an outlet of the high-temperature heat collection device.

According to the first configuration, the metal temperature of the high-temperature heat collection device is controlled to be not higher than the threshold temperature. Accordingly, it is possible to prevent overshoot of the steam temperature at the outlet of the high-temperature heat collection device. Thus, it is possible to reduce the risk of damage to heat transfer pipes of the high-temperature heat collection device.

According to a second configuration of the invention, there is provided a solar heat collection system according to the first configuration, further including: a metal temperature detector which detects the metal temperature of the high-temperature heat collection device; and a flow rate detector which detects a flow rate of the superheated steam generated by the high-temperature heat collection device; wherein: the heliostat control device controls the angles of the plurality of heliostats based on temperature data acquired by the metal temperature detector and flow rate data acquired by the flow rate detector.

According to the second configuration, the heliostats are controlled based on the data of the metal temperature of the high-temperature heat collection device and the data of the flow rate of the superheated steam. Accordingly, it is possible to adjust the steam temperature at the outlet of the high-temperature heat collection device accurately. Thus, it is possible to reduce the risk of damage to the heat transfer pipes of the high-temperature heat collection device more greatly.

According to a third configuration of the invention, there is provided a solar heat collection system according to the first or second configuration, further including: a first temperature detector which detects steam temperature at an inlet of the steam-water separation device; wherein: the heliostat control device controls the angles of the plurality of heliostats so that sunlight can be reflected toward the high-temperature heat collection device by the heliostats at any timing after a timing when the low-temperature heat collection device is started up and before the temperature detected by the first temperature detector reaches a saturated steam temperature.

According to the third configuration, the metal temperature of the high-temperature heat collection device begins to increase after the low-temperature heat collection device is started up. Accordingly, it is easy to control the metal temperature of the high-temperature heat collection device to be not higher than the threshold temperature. That is, according to the third configuration, due to the easy control to make the start-up of the high-temperature heat collection device later than the start-up of the low-temperature heat collection device, the increase of the metal temperature of the high-temperature heat collection device can be suppressed effectively to thereby reduce the risk of damage to the heat transfer pipes.

Further, according to the third configuration, the high-temperature heat collection device is started up before the temperature detected by the first temperature detector reaches the saturated steam temperature. Accordingly, it is possible to prevent steam from flowing into the high-temperature heat collection device in the state in which the metal temperature of the high-temperature heat collection device is lower than the saturated steam temperature.

According to a fourth configuration of the invention, there is provided a solar heat collection system according to the first or second configuration, further including: a second temperature detector which detects steam temperature at an outlet of the low-temperature heat collection device; wherein: the heliostat control device controls the angles of the plurality of heliostats so that sunlight can be reflected toward the high-temperature heat collection device by the heliostats at any timing after a timing when the low-temperature heat collection device is started up and before the temperature detected by the second temperature detector reaches a saturated steam temperature.

According to the fourth configuration, the metal temperature of the high-temperature heat collection device begins to increase after the low-temperature heat collection device is started up. Accordingly, it is easy to control the metal temperature of the high-temperature heat collection device to be not higher than the threshold temperature. That is, according to the fourth configuration, due to the easy control to make the start-up of the high-temperature heat collection device later than the start-up of the low-temperature heat collection device, the increase of the metal temperature of the high-temperature heat collection device can be suppressed effectively to thereby reduce the risk of damage to the heat transfer pipes.

Further, according to the fourth configuration, the high-temperature heat collection device is started up before the temperature detected by the second temperature detector reaches the saturated steam temperature. Accordingly, it is possible to prevent steam from flowing into the high-temperature heat collection device in the state in which the metal temperature of the high-temperature heat collection device is lower than the saturated steam temperature.

According to a fifth configuration of the invention, there is provided a solar heat collection system according to any one of the first through fourth configurations, wherein: the low-temperature heat collection device includes a trough type light/heat collection device in which heat transfer pipes are disposed above inner circumferential curved surfaces of light collection mirrors each extending like a trough so that sunlight can be concentrated on the heat transfer pipes by the light collection mirrors to heat water circulating in the heat transfer pipes to thereby generate steam, or a Fresnel type light/heat collection device in which a large number of substantially planar light collection mirrors are arranged side by side and heat transfer pipes are disposed above the group of light collection mirrors so that sunlight can be concentrated on the heat transfer pipes by the group of light collection mirrors to heat water circulating in the heat transfer pipes to thereby generate steam; the high-temperature heat collection device includes a tower type light/heat collection device in which a heat transfer pipe panel is installed on a tower having a predetermined height so that sunlight can be concentrated on the heat transfer pipe panel by the plurality of heliostats to heat water circulating in the heat transfer pipe panel to thereby generate steam; and the heliostat control device adjusts the angles of the heliostats so that sunlight can be concentrated on the heat transfer pipe panel by the heliostats at long distances from the tower earlier than by the heliostats at short distances from the tower.

According to the fifth configuration, it is possible to prevent the metal temperature of the high-temperature heat collection device from increasing suddenly. Accordingly, it is possible to suppress the risk of damage to the heat transfer pipe panel more greatly.

According to a sixth configuration of the invention, there is provided a solar heat collection system according to the fifth configuration, wherein: a spray valve is provided to spray water onto the superheated steam generated by the high-temperature heat collection device so as to make the temperature of the superheated steam stable.

According to the sixth configuration, it is possible to supply the superheated steam at stable temperature. Accordingly, when, for example, the solar heat collection system according to the sixth configuration is used to be incorporated into a solar thermal power plant etc., performance of the plant as a whole can be improved.

Advantageous Effects of Invention

According to the invention, it is possible to reduce the risk of damage to the heat transfer pipes of the high-temperature heat collection device. Incidentally, problems, configurations and effects other than the aforementioned ones will be made clear from description of the following embodiments.

BRIEF DESCRIPTION OF DRAWINGS

FIG. 1 A schematic diagram of the configuration of a solar heat collection system according to a first embodiment of the invention.

FIG. 2 A schematic diagram of the configuration of a tower type light/heat collection device in which a high-temperature heat collection device shown in FIG. 1 is installed.

FIG. 3 A schematic diagram of the configuration of a heat transfer panel of the high-temperature heat collection device shown in FIG. 2.

FIGS. 4 Graphs showing various data in the case where the solar heat collection system according to the first embodiment is used to generate steam.

FIG. 5 A schematic diagram of the configuration of a solar heat collection system according to a second embodiment of the invention.

FIG. 6 A principle diagram for explaining the configuration etc. of a trough type light/heat collection device.

FIG. 7 A principle diagram for explaining the configuration etc. of a Fresnel type light/heat collection device.

FIG. 8 A schematic diagram of the configuration of a solar heat collection system according to a third embodiment of the invention.

FIG. 9 A schematic diagram of the configuration of a solar heat collection system according to a fourth embodiment of the invention.

FIGS. 10 Graphs showing various data in the case in which the solar heat collection system according to the fourth embodiment is used to generate steam.

FIGS. 11 (a) is a view showing light collection efficiency per heliostat with respect to a distance X between a tower and the heliostat and (b) is a top view of a high-temperature heat collection device.

FIG. 12 A schematic diagram of the configuration of a solar heat collection system according to a fifth embodiment of the invention.

FIG. 13 A schematic diagram of the configuration of a solar heat collection system according to a sixth embodiment of the invention.

FIG. 14 A schematic diagram of the configuration of a solar heat collection system according to a seventh embodiment of the invention.

FIGS. 15 Graphs showing various data in the case in which a solar heat collection system according to the background art is used to generate steam.

DESCRIPTION OF EMBODIMENTS

The contents of the invention will be described in detail in undermentioned embodiments, but the invention is not limited to the embodiments.

[First Embodiment]

FIG. 1 is a schematic diagram of the configuration of a solar heat collection system SYS1 according to a first embodiment of the invention. The solar heat collection system SYS1 is used for supplying superheated steam to a steam turbine of a solar thermal power plant. Incidentally, although not shown, the solar thermal power plant has a configuration including the steam turbine, a power generator, a steam condenser, and a line. The steam turbine is driven by superheated steam generated by a high-temperature heat collection device 5 of the solar heat collection system SYS1. The power generator generates electric power by use of motive power of the steam turbine. The steam condenser condenses the superheated steam supplied to the steam turbine into water. Through the line, the water condensed by the steam condenser is supplied to a low-temperature heat collection device 1 of the solar heat collection system SYS1.

In FIG. 1, the reference numeral 1 designates a low-temperature heat collection device which heats water by use of sunlight heat; 2, a feedwater pump; 3, a water supply valve; 4, a steam-water separation device which separates a water-steam two-phase fluid generated by the low-temperature heat collection device 1 into water and steam; 5, a high-temperature heat collection device which heats steam by use of sunlight heat; 6, the sun; 7, sunlight from the sun; 8, heliostats; 9, a tower; 10, a steam valve; 11; a flowmeter (flow rate detector) which measures a flow rate of the steam from the high-temperature heat collection device 5; 12, a thermometer (metal temperature detector) which measures metal temperature of the high-temperature heat collection device 5; 13, an arithmetic device (heliostat control device) which adjusts an angle of any heliostat 8 based on flow rate data acquired by the flowmeter 11 and temperature data acquired by the thermometer 12; 14, a circulating pump; and 40, a spray valve. Incidentally, the reason why the spray valve 40 is provided in a branch pipe branching from a pipe connecting the feedwater pump 2 and the water supply valve 3 is that the temperature of supplied water is most stable so that the flow rate of the water can be adjusted easily.

In the following description, pipes connecting respective constituent elements will be expressed as lines O-O. Each of the aforementioned Os will be replaced by a reference numeral or sign. For example, a line 2-3 expresses a pipe connecting the feedwater pump 2 and the water supply valve 3.

In the solar heat collection system SYS1, as shown in FIG. 1, water supplied from the feedwater pump 2 first passes through the line 2-3. The flow rate of the water is adjusted by the water supply valve 3. Then, the adjusted water is delivered to the low-temperature heat collection device 1 through a line 3-1. In the low-temperature heat collection device 1, the supplied water is heated by sunlight heat so that a water-steam two-phase fluid can be generated. The generated water-steam two-phase fluid is delivered to the steam-water separation device 4 through a line 1-4.

The water-steam two-phase fluid led into the steam-water separation device 4 is separated into water and steam by the steam-water separation device 4. The separated saturated steam is delivered to the high-temperature heat collection device 5 through a line 4-5. The saturated steam led into the high-temperature heat collection device 5 is further heated by solar heat in the high-temperature heat collection device 5 so that superheated steam can be generated. Incidentally, the water separated by the steam-water separation device 4 is delivered to the circulating pump 14 through a line 4-14. Water pressurized by the circulating pump 14 is delivered to an inlet of the low-temperature heat collection device 1 through a line 14-1.

The superheated steam generated by the high-temperature heat collection device 5 is passed through a line 5-11 so that the flow rate of the superheated steam can be measured by the flowmeter 11. The superheated steam is passed through a line 11-10 so that the flow rate of the superheated steam can be adjusted by the steam valve 10. Incidentally, the flow rate data of the flowmeter 11 are inputted to the arithmetic device 13. In addition, the metal temperature of the high-temperature heat collection device 5 is measured by the thermometer 12. The temperature data of the thermometer 12 are inputted to the arithmetic device 13. Further, the arithmetic device 13 has a mechanism for adjusting the angle of any heliostat 8 based on the inputted flow rate data and the inputted temperature data (the details will be described later). Incidentally, the metal temperature detector according to the invention is not limited to the thermometer but may include a metal temperature detector based on photographic data analysis using a thermography or a camera.

FIG. 2 is a schematic diagram of the configuration of a tower type light/heat collection device in which the high-temperature heat collection device 5 shown in FIG. 1 is installed. FIG. 3 is a schematic diagram of the configuration of a heat transfer panel of the high-temperature heat collection device 5.

As shown in FIG. 2, in the tower type light/heat collection device, the high-temperature heat collection device 5 (heat transfer pipe panel 27) is installed on a tower 9 having a predetermined height (about 30 m to 100 m). On the other hand, a large number of heliostats 8 are arranged in various directions on the ground surface. The group of the heliostats 8 track the movement of the sun 6 to concentrate light on the high-temperature heat collection device 5 (heat transfer pipe panel 27) so that superheated steam can be generated in the high-temperature heat collection device 5. With such a mechanism, the tower type light/heat collection device can generate higher temperature steam than a trough type light/heat collection device. Accordingly, when the tower type light/heat collection device is used in a solar thermal power plant, there is an advantage that turbine efficiency can be improved and more electric power can be obtained.

As shown in FIG. 3, the heat transfer pipe panel 27 used in the high-temperature heat collection device 5 is constituted by a superheater lower header 22, a large number of superheater heat transfer pipes 21, and a superheater upper header 23. The superheater lower header 22 distributes the steam from the steam-water separation device 4 uniformly. The superheater heat transfer pipes 21 are disposed in parallel so that the steam distributed by the superheater lower header 22 can be made to flow through the superheater heat transfer pipes 21. The superheater upper header 23 collects superheated steam flowing out of the superheater heat transfer pipes 21. The superheated steam coming out of the superheater upper header 23 is supplied to the not-shown steam turbine.

Next, FIGS. 4(*a*), (*b*), (*c*), (*d*), (*e*) and (*f*) will be used respectively for explaining change in amount of solar radiation, change in metal temperature of the low-temperature heat collection device, change in steam temperature at an inlet of the steam-water separation device, change in steam flow rate at an inlet (outlet) of the high-temperature heat collection device, change in metal temperature of the high-temperature heat collection device, and change in steam temperature at the outlet of the high-temperature heat collection device in the case where the solar heat collection system SYS1 according to the first embodiment is used to generate steam.

When the amount of solar radiation begins to increase in a time instant t1 as shown in FIG. 4(*a*), the low-temperature heat collection device 1 is started up and the metal temperature of the low-temperature heat collection device 1 begins to increase as shown in FIG. 4(*b*). The steam temperature reaches a saturated steam temperature T3 at the inlet of the steam-water separation device 4 in a time instant t3, as shown in FIG. 4(*c*). On this occasion, the arithmetic device 13 adjusts an angle of any heliostat 8 based on the flow rate data acquired by the flowmeter 11 and the temperature data acquired by the thermometer 12 so that the metal temperature of the high-temperature heat collection device 5 can be prevented from exceeding a threshold temperature Tc (Tc=600° C. to 660° C.), as shown in FIG. 4(*e*).

Thus, even in a moment (time instant t4 in FIG. 4(*d*)) when the saturated steam whose temperature has increased up to the saturated steam temperature T3 flows into the high-temperature heat collection device 5, a temperature amount with which the steam temperature may overshoot at the outlet of the high-temperature heat collection device 5 can be reduced so that the risk of thermal damage to the heat transfer pipes of the high-temperature heat collection device 5 can be reduced (see FIG. 4(*f*)).

[Embodiment 2]

FIG. 5 is a schematic diagram of the configuration of a solar heat collection system SYS2 according to a second embodiment of the invention. In the embodiment, a low-temperature heat collection device 15 including a trough type light/heat collection device is used. The remaining configuration etc. is the same as that in the first embodiment so that duplicate description thereof will be omitted.

FIG. 6 is a principle diagram for explaining the configuration etc. of the trough type light/heat collection device. In the trough type light/heat collection device, heat transfer pipes 31 are disposed horizontally and individually in focal positions above inner circumferential curved surfaces of light collection mirrors 30 each extending like a trough, so that sunlight 7 can be concentrated on the heat transfer pipes 31 by the light collection mirrors 30, as shown in FIG. 6. Water 33 circulates in the respective heat transfer pipes 31. The water 33 is heated by the heat collected by the heat transfer pipes 31 so that a water-steam two-phase fluid 34 can be obtained from the heat transfer pipes 31. With such a mechanism, the trough type light/heat collection device has an advantage that sophisticated light collection technology is not required and the structure is comparatively simple.

In the second embodiment, a low-temperature heat collection device including a Fresnel type light/heat collection device may be used in place of the low-temperature heat collection device 15 including the trough type light/heat collection device. FIG. 7 is a principle diagram for explaining the configuration etc. of the Fresnel type light/heat collection device. As shown in FIG. 7, in the Fresnel type light/heat collection device, a large number of planar or slightly curved light collection mirrors 35 whose angles are changed little by little are arranged side by side, and a group of heat transfer pipes 31 which are formed into a panel shape are disposed horizontally at a place several meters above the group of light collection mirrors 35.

Sunlight 7 is concentrated on the group of heat transfer pipes 31 by the group of light collection mirrors 35, and water 33 circulating in the respective heat transfer pipes 31 is heated so that a water-steam two-phase fluid 34 can be obtained from the heat transfer pipes 31. With such a mechanism, the Fresnel type light/heat collection device has an advantage that manufacturing of the Fresnel type light/heat collection device is simpler and cheaper than that using the trough type curved light collection mirrors 30 and the light collection mirrors 35 are hardly affected by wind pressure.

[Third Embodiment]

FIG. 8 is a schematic diagram of the configuration of a solar heat collection system SYS3 according to a third embodiment of the invention. In FIG. 8, the reference numeral 17 designates a thermometer which is provided at a steam outlet of a low-temperature heat collection device 1; 18, a flowmeter which measures a flow rate of a water-steam two-phase fluid led from the low-temperature heat collection device 1 into a steam-water separation device 4; 43, a thermometer which is provided at a steam inlet of the steam-water separation device 4; and 19, an arithmetic device. The remaining configuration etc. is the same as that in the first embodiment so that duplicate description thereof will be omitted.

In the third embodiment, the temperature of the steam is measured by the thermometer 17 provided at the outlet of the low-temperature heat collection device 1. The flow rate of the steam is measured by the flowmeter 18. The arithmetic device 19 controls a valve opening degree of a water supply valve 3 to adjust the flow rate of water supplied to the low-temperature heat collection device 1 so that the respective measurement data of the thermometer 17 and the flowmeter 18 can be equal to predetermined values. Specifically, the flow rate of the water supplied to the low-temperature heat collection device 1 is adjusted so that the steam temperature at the outlet of the low-temperature heat collection device 1 cannot be higher than 300° C. Thus, an amount of the steam generated by the low-temperature heat collection device 1 can be optimized in accordance with a heat collection amount. Incidentally, the thermometer 43 provided at the steam inlet of the steam-water separation device 4 may be used in place of the thermometer 17 provided at the steam outlet of the low-temperature heat collection device 1 so that the thermometer 43 and the flowmeter 18 can be used to control the water supply valve 3.

[Fourth Embodiment]

FIG. 9 is a schematic diagram of the configuration of a solar heat collection system SYS4 according to a fourth embodiment of the invention. In FIG. 9, the reference numeral 20 designates a thermometer which is provided at a steam outlet of a low-temperature heat collection device 1; 21, a flowmeter which measures a flow rate of a water-steam two-phase fluid led from the low-temperature heat collection device 1 into a steam-water separation device 4; 44, a thermometer which is provided at a steam inlet of the steam-water separation device 4; and 22, an arithmetic device. The remaining configuration etc. is the same as that in the first embodiment so that duplicate description thereof will be omitted.

In the fourth embodiment, the temperature of the steam is measured by the thermometer 20 provided at the outlet of the low-temperature heat collection device 1. The flow rate of the steam is measured by the flowmeter 21. The arithmetic device 22 adjusts a heat collection amount of the low-temperature heat collection device 1 so that the respective measurement data of the thermometer 20 and the flowmeter 21 can be equal to predetermined values. Specifically, the heat collection amount of the low-temperature heat collection device 1 is adjusted so that the steam temperature at the outlet of the low-temperature heat collection device 1 cannot be higher than 300° C. Thus, an amount of the steam generated by the low-temperature heat collection device 1 can be optimized in accordance with the flow rate of supplied water. Incidentally, the thermometer 44 provided at the steam inlet of the steam-water separation device 4 may be used in place of the thermometer 20 provided at the steam outlet of the low-temperature heat collection device 1 so that the thermometer 44 and the flowmeter 21 can be used to control the heat collection amount of the low-temperature heat collection device 1.

Further, by different control made in the fourth embodiment from that in the first embodiment, metal temperature of a high-temperature heat collection device 5 can be kept to be not higher than a threshold temperature Tc. The control will be described below in detail with reference to FIGS. 10. Incidentally, in the fourth embodiment, the threshold temperature Tc of the metal temperature of the high-temperature heat collection device 5 is set at 600° C. to 660° C. In addition, in each of FIGS. 10(*d*), (*f*) and (*g*), the solid line designates change in the case in which the solar heat collection system SYS4 according to the fourth embodiment of the invention is used, and the two-dot chain line designates change in the case in which the solar heat collection system according to the background art is used.

In the solar heat collection system SYS4, the low-temperature heat collection device 1 is started up to start light collection as soon as the amount of solar radiation begins to increase (time instant t1), as shown in FIG. 10(*a*). Then, metal temperature of the low-temperature heat collection device 1 begins to increase, as shown in FIG. 10(*b*). In addition, when the low-temperature heat collection device 1 is started up, water circulating in the low-temperature heat collection device 1 is gradually heated and the temperature of the fluid at the inlet of the steam-water separation device 4 increases. On this occasion, the high-temperature heat collection device 5 has not been started up yet. Accordingly, the metal temperature of the high-temperature heat collection device 5 hardly increases (see a range of from a time instant t1 to a time instant t2 in FIG. 10(*f*)).

When the temperature of the fluid at the inlet of the steam-water separation device 4 reaches a predetermined temperature T2 (in the time instant t2), a part (N1) of the heliostats 8 are inclined to face a heat transfer panel 27 (receiver part) of the high-temperature heat collection device 5, as shown in FIG. 10(*d*). As a result, a part of sunlight 7 is applied as reflected light onto the heat transfer panel 27 of the high-temperature heat collection device 5. Thus, the metal temperature of the high-temperature heat collection device 5 increases gradually from the time instant t2 (FIG. 10(*f*)).

Further, the number of the heliostats 8 inclined to face the heat transfer panel 27 of a tower 9 increases gradually with the passage of time. When it is a time instant t4 which is slightly later than a time instant t3 in which the temperature of the fluid at the inlet of the steam-water separation device 4 (the temperature measured by the thermometer 44) reaches a saturated steam temperature T3, all (N2) of the heliostats 8 are inclined to face the heat transfer panel 27.

Thus, the high-temperature heat collection device 5 is started up later than the low-temperature heat collection device 1 is started up, and the number of heliostats 8 also increases gradually. Accordingly, the light collection amount of the high-temperature heat collection device 5 increases gradually. As a result, the metal temperature of the high-temperature heat collection device 5 can be increased gradually from the time instant t2. In addition, the metal temperature of the high-temperature heat collection device 5 can be kept at the threshold temperature Tc in the time instant t4 in which the saturated steam separated from the steam-water separation device 4 is led into the high-temperature heat collection device 5.

Here, the control of the heliostats 8 will be described in detail with reference to FIGS. 11. FIG. 11(*a*) is a view showing light collection efficiency per heliostat with respect to a distance X between the tower and the heliostat. FIG. 11(*b*) is a top view of the high-temperature heat collection device 5. As shown in FIG. 11(*b*), a large number of heliostats 8 are disposed around the tower 9 and divided into three areas, i.e. Area (a), Area (b) and Area (c), sequentially in ascending order of a distance from the tower 9. As illustrated in the drawing, a plurality of heliostats 8 are disposed in each of the areas.

As shown in FIG. 11(*a*), the light collection efficiency decreases as the distance from the tower 9 as the origin increases (the value of the distance X increases). The reason is as follows. As the distance between the heliostat 8 and the tower 9 increases, the inclination angle of the heliostat 8 increases in order to irradiate the heat transfer panel 27 with reflected light, but a light receiving area of a mirror decreases (cosine effect). Incidentally, the aforementioned light collection efficiency means a ratio of an amount of energy incident on the heat transfer panel 27 serving as the receiver part to an amount of solar energy per mirror area. As the distance between the tower 9 and the heliostat 8 is shorter and the inclination angle of the heliostat 8 for irradiating the heat transfer panel 27 with reflected light is smaller, the light receiving area is larger. Accordingly, the light collection efficiency is larger.

In the embodiment, the light receiving area in each of the heliostats 8 installed in Area (a) is large and the light collection efficiency is 1.0. As the value of the distance X increases, the light collection efficiency decreases. That is, the relation of Area (a)>Area (b)>Area (c) is established between the light collection efficiency and the light receiving area of each heliostat 8.

In the embodiment, the heliostats 8 are operated in turn in descending order of the distance from the tower 9. Specifically, the arithmetic device 13 first controls the angles of the heliostats 8 installed in Area (c) to reflect the sunlight 7 toward the high-temperature heat collection device 5 in a timing of a time instant t2 in which the temperature data measured by the thermometer 44 reaches T2. When the control of the heliostats 8 installed in Area (c) is completed, the arithmetic device 13 then controls the angles of the heliostats 8 installed in Area (b). When the control of the heliostats 8 installed in Area (b) is completed, the arithmetic device 13 controls the angles of the heliostats 8 installed in Area (a). Thus, the number of heliostats 8 increases stepwise from the time instant t2 to the time instant t4, as shown in FIG. 10(d).

Incidentally, FIG. 10(d) shows an example in which the angles of the heliostats 8 are controlled stepwise in the order of Area (c), Area (b) and Area (a), and the angles of the heliostats 8 in each of the areas are also controlled stepwise in descending order of the distance from the tower 9. Therefore, the number of heliostats 8 increases to draw a curved line from the time instant t2 to the time instant t4. Incidentally, the angles of the heliostats 8 may be controlled in a lump in accordance with each area. In this case, the number of heliostats 8 increases stepwise between the time instant t2 and the time instant t4.

The light collection efficiency of each heliostat 8 decreases as the heliostat 8 is more distant from the tower 9. Therefore, when the angles of the heliostats 8 are controlled thus stepwise from the area at a long distance from the tower 9 to the area at a short distance from the tower 9, the metal temperature of the high-temperature heat collection device 5 can be prevented from increasing suddenly in the state in which steam has not flowed into the high-temperature heat collection device 5 yet. Accordingly, it is possible to adjust the metal temperature of the high-temperature heat collection device 5 accurately. As a result, it is possible to suppress occurrence of overshoot of steam temperature at the outlet of the high-temperature heat collection device 5 so that it is possible to avoid the risk of damage to the heat transfer panel 27.

Incidentally, a change in steam temperature caused by the fluctuation of the amount of solar radiation can be covered when a water supply valve 3 is operated to increase/decrease the amount of supplied water. In addition, although the arithmetic device 13 controls the heliostats 8 based on the temperature data measured by the thermometer (first temperature detector) 44, the arithmetic device 13 may control the heliostats 8, as described above, based on the temperature data measured by the thermometer (second temperature detector) 20 provided at the steam outlet of the low-temperature heat collection device 1.

[Fifth Embodiment]

FIG. 12 is a schematic diagram of the configuration of a solar heat collection system SYS5 according to a fifth embodiment of the invention. In FIG. 12, the reference numeral 23 is a water level gauge which measures a water level of a steam-water separation device 4; 25, a circulation flow rate control valve which adjusts a circulation rate of water between a low-temperature heat collection device 1 and the steam-water separation device 4; and 24, an arithmetic device. The remaining configuration etc. is the same as that in the first embodiment so that duplicate description thereof will be omitted.

In the fifth embodiment, a flow rate or the circulation rate of supplied water can be adjusted by a water supply valve 3 or the circulation flow rate control valve 25 so that the water level of the steam-water separation device 4 can be equal to a predetermined value. Accordingly, an amount of water contained in the low-temperature heat collection device 1 can be kept constant. Further, according to the fifth embodiment, water can be prevented from flowing into a high-temperature heat collection device 5 when the water exceeds the capacity of the tank of the steam-water separation device 4.

[Sixth Embodiment]

FIG. 13 is a schematic diagram of the configuration of a solar heat collection system SYS6 according to a sixth embodiment of the invention. In FIG. 13, the reference numeral 26 designates a heating medium channel in which a heating medium circulates; 27, a heating medium circulating pump which is provided in the middle of the heating medium channel 26; 28, a light/heat collection device which is provided in the middle of the heating medium channel 26 so that heat generated due to collection of sunlight 7 can be transferred to the heating medium circulating in the heating medium channel 26; and 29, a heat exchanger-including low-temperature heat collection device in which a part of the heating medium channel 26 is installed internally as a heat exchanger. The remaining configuration etc. is the same as that in the first embodiment so that duplicate description thereof will be omitted.

The sixth embodiment has a configuration in which heat collected by the light/heat collection device 28 is transferred to water inside the heat exchanger-including low-temperature heat collection device 29 through the heating medium. Accordingly, a medium large in heat capacity such as oil or molten salt can be used as the heating medium so that the temperature of the low-temperature heat collection device can be suppressed from decreasing when the amount of solar radiation is attenuated. Thus, steam can be generated more quickly when the amount of solar radiation is recovered.

[Seventh Embodiment]

FIG. 14 is a schematic diagram of the configuration of a solar heat collection system SYS7 according to a seventh embodiment of the invention. In FIG. 14, the reference numeral 41 designates a thermometer which is provided on a downstream side of a steam valve 10 and for measuring the temperature of steam supplied to a not-shown steam turbine; and 42, an arithmetic device. The remaining configuration etc. is the same as that in the first embodiment so that duplicate description thereof will be omitted.

In the seventh embodiment, temperature data measured by the thermometer 41 are sent to the arithmetic device 42. The arithmetic device 42 opens/closes a spray valve 40 based on the temperature data of the thermometer 41 to thereby control a spray amount. Thus, it is possible to make the temperature of the steam supplied to the steam turbine stable. Particularly, the spray valve 40 is provided in a position shown in FIG. 14 to use supplied water. Accordingly, the spray temperature is stable. As a result, the temperature of the steam can be kept more stable in the seventh embodiment.

According to each of the embodiments of the invention as described above, control can be made so that the metal temperature of the high-temperature heat collection device 5 cannot be higher than a threshold temperature. Accordingly, it is possible to prevent overshoot of the steam temperature at the outlet of the high-temperature heat collection device so that it is possible to reduce the risk of damage to the heat transfer panel 27 of the high-temperature heat collection device.

REFERENCE SIGNS LIST 1 low-temperature heat collection device
4 steam-water separation device
5 high-temperature heat collection device
7 sunlight
8 heliostat
9 tower
11 flowmeter (flow rate detector)
12 thermometer (metal temperature detector)
13 arithmetic device (heliostat control device)
15 trough type low-temperature heat collection device (low-temperature heat collection device)
20 thermometer (second temperature detector)
27 heat transfer panel
30 light collection mirror
31 heat transfer pipe
35 light collection mirror
40 spray valve
44 thermometer (first temperature detector)
T3 saturated steam temperature
Tc threshold temperature

The invention claimed is:

1. A solar heat collection system comprising:
a low-temperature heat collection device which heats water by use of sunlight heat to thereby generate steam;
a steam-water separation device which separates a water-steam two-phase fluid generated by the low-temperature heat collection device into water and steam;
a high-temperature heat collection device which heats the steam separated by the steam-water separation device by use of heat of sunlight which is reflected by a plurality of heliostats to thereby generate superheated steam; and
a heliostat control device which controls angles of the plurality of heliostats so that a metal temperature of the high-temperature heat collection device cannot be higher than a threshold temperature which is set in order to prevent overshoot of steam temperature at an outlet of the high-temperature heat collection device,
wherein the low-temperature heat collection device includes a trough device to collect light and heat in which heat transfer pipes are disposed above inner circumferential curved surfaces of light collection mirrors each extending in a shape of a trough so that sunlight can be concentrated on the heat transfer pipes by the light collection mirrors to heat water circulating in the heat transfer pipes to thereby generate steam, or a Fresnel device to collect light and heat in which a large number of substantially planar light collection mirrors are arranged side by side and heat transfer pipes are disposed above a group of light collection mirrors so that sunlight can be concentrated on the heat transfer pipes by the group of light collection mirrors to heat water circulating in the heat transfer pipes to thereby generate steam;
wherein the high-temperature heat collection device includes a tower device to collect light and heat in which a heat transfer pipe panel is installed on a tower having a predetermined height so that sunlight can be concentrated on the heat transfer pipe panel by the plurality of heliostats to heat water circulating in the heat transfer pipe panel to thereby generate steam, the plurality of heliostats comprising a first heliostat and a second heliostat, the first heliostat being closer to the high-temperature heat collection device than the second heliostat; and
wherein the heliostat control device adjusts the angles of the heliostats such that an angle of the second heliostat is adjusted to concentrate the sunlight on the heat transfer pipe panel prior to adjusting an angle of the first heliostat.

2. A solar heat collection system according to claim 1, further comprising:
a metal temperature detector which detects the metal temperature of the high-temperature heat collection device; and
a flow rate detector which detects a flow rate of the superheated steam generated by the high-temperature heat collection device; wherein:
the heliostat control device controls the angles of the plurality of heliostats based on temperature data acquired by the metal temperature detector and flow rate data acquired by the flow rate detector.

3. A solar heat collection system according to claim 1, further comprising:
a first temperature detector which detects steam temperature at an inlet of the steam-water separation device; wherein:
the heliostat control device controls the angles of the plurality of heliostats so that sunlight can be reflected toward the high-temperature heat collection device by the heliostats at any timing after a timing when the low-temperature heat collection device is started up and before the temperature detected by the first temperature detector reaches a saturated steam temperature.

4. A solar heat collection system according to claim 1, further comprising:
a second temperature detector which detects steam temperature at an outlet of the low-temperature heat collection device; wherein:
the heliostat control device controls the angles of the plurality of heliostats so that sunlight can be reflected toward the high-temperature heat collection device by the heliostats at any timing after a timing when the low-temperature heat collection device is started up and before the temperature detected by the second temperature detector reaches a saturated steam temperature.

5. A solar heat collection system according to claim 1, wherein:
a spray valve is provided to spray water onto the superheated steam generated by the high-temperature heat collection device so as to make the temperature of the superheated steam stable.

* * * * *